United States Patent
Arora

(10) Patent No.: US 12,432,214 B2
(45) Date of Patent: Sep. 30, 2025

(54) METHODS, SYSTEMS AND COMPUTER PROGRAM PRODUCTS FOR SECURE RETRIEVAL OF DATA

(71) Applicant: NOW.GG, INC., Campbell, CA (US)

(72) Inventor: Sohil Arora, Gurugram (IN)

(73) Assignee: NOW.GG, INC., Campbell, CA (US)

( * ) Notice: Subject to any disclaimer, the term of this patent is extended or adjusted under 35 U.S.C. 154(b) by 160 days.

(21) Appl. No.: 18/082,077

(22) Filed: Dec. 15, 2022

(65) Prior Publication Data

US 2023/0188528 A1    Jun. 15, 2023

Related U.S. Application Data

(60) Provisional application No. 63/289,838, filed on Dec. 15, 2021.

(51) Int. Cl.
*G06F 21/00*    (2013.01)
*H04L 9/40*    (2022.01)

(52) U.S. Cl.
CPC ............ *H04L 63/102* (2013.01); *H04L 63/20* (2013.01)

(58) Field of Classification Search
CPC . H04L 9/32; H04L 63/00; H04L 63/14; H04L 63/102; H04L 63/20; H04W 12/06; H04W 12/00
USPC .......................................................... 726/4
See application file for complete search history.

(56) References Cited

U.S. PATENT DOCUMENTS

| | | | |
|---|---|---|---|
| 2011/0238977 A1* | 9/2011 | Talbert ................... | H04N 7/183 713/150 |
| 2014/0331060 A1* | 11/2014 | Hayton ................... | G06F 21/32 713/185 |
| 2016/0147945 A1 | 5/2016 | MacCarthy et al. | |
| 2017/0149774 A1* | 5/2017 | Blinn ..................... | H04L 63/083 |
| 2019/0208354 A1 | 7/2019 | Raduchel et al. | |
| 2019/0228178 A1* | 7/2019 | Sharma ............... | H04L 63/0853 |
| 2021/0160231 A1* | 5/2021 | Kumar ................ | H04L 63/0815 |
| 2021/0357489 A1 | 11/2021 | Tali et al. | |
| 2023/0026330 A1* | 1/2023 | Rolando ................. | H04L 63/20 |

\* cited by examiner

*Primary Examiner* — Josnel Jeudy
(74) *Attorney, Agent, or Firm* — The Webb Law Firm

(57) ABSTRACT

The invention enables access to data associated with any of a plurality of cloud services, through a unified portal. The invention is implemented through a trusted intermediary server configured for receiving a user identifier associated with a client terminal user, generating a validation code, and transmitting the user identifier and validation code to a cloud services server associated with a selected cloud services application. The cloud services server responds to receiving the user identifier by identifying a terminal device associated with the user identifier, and transmitting the validation code to the identified terminal device. The user is prompted to input a validation code. Responsive to the validation code matching the code entered by the user, the trusted intermediary server retrieves data that is associated with the user and the selected cloud services application, and enables the user to access the retrieved data through the client terminal.

9 Claims, 8 Drawing Sheets

METHODS, SYSTEMS AND COMPUTER PROGRAM PRODUCTS FOR SECURE RETRIEVAL OF DATA

CROSS-REFERENCE TO RELATED APPLICATION

This application claims priority to U.S. Provisional Patent Application No. 63/289,838 filed Dec. 15, 2021, the disclosure of which is hereby incorporated by reference in its entirety.

BACKGROUND OF THE INVENTION

Field of the Invention

The present invention relates to the domain of cloud based software services. In particular, the present invention provides methods, systems and computer program products for accessing data for enabling secure access to the data or records of a cloud services server through a trusted intermediary server.

Description of Related Art

With the increase in availability of affordable computing hardware, it has become commonplace for individuals to use a plurality of computing devices or data processing devices for accessing cloud based, or network based, services— including for example, cloud bases gaming services. Such cloud based services offer significant opportunities for generation, storage and on-demand retrieval of digital data and/or data records Typically however, accessing or retrieving data or records associated with any cloud service requires a user to first log-in to the concerned cloud services server and then access the data or records controlled by such cloud services server. Given the large number of cloud services available and used on a day-to-day basis, it is inconvenient and time consuming for a user to have to individually log in to each cloud services server from which the user intends to access or retrieve data records.

There is accordingly a need for solutions that enable straightforward, secure and centralized access or retrieval of data or records that are associated with any of a plurality of cloud services, through a unified portal or a unified data management platform.

SUMMARY OF THE INVENTION

The invention enables secure and centralized access/retrieval of data or records that are associated with any of a plurality of cloud services, through a unified portal or a unified data management platform.

In an embodiment, the invention provides a method for enabling secure network access to data records associated with a selected cloud services application from among a plurality of cloud service applications, through a trusted intermediary server. The method comprises (i) establishing network communication between the trusted intermediary server and a client terminal operated by a user, (ii) selecting based on user input received through the client terminal, a cloud services application from among a plurality of cloud service applications, for retrieving data associated with the selected cloud services application, (iii) receiving a user identifier a comprising an identifier uniquely associated with the user in the records of the selected cloud services application, (iv) generating a validation code, (v) transmitting to a cloud services server associated with the selected cloud services application (a) the user identifier, and (b) the validation code—wherein the cloud services server is configured to respond to transmission of the user identifier by (c) identifying a terminal device that is associated with the user identifier, and (d) transmitting the validation code to the identified terminal device, (vi) initiating through the client terminal, a prompt for the user to input a validation code, (vii) receiving from the client terminal, a code that has been input by the user at the client terminal in response to the prompt, and (viii) responsive to determining that the validation code matches the received code that has been input by the user at the client terminal (e) retrieving from a database associated with the selected cloud services application, data that is associated with both of the user and the selected cloud services application, and (f) enabling the user to access the retrieved data through the client terminal.

The invention also provides a system for enabling secure network access to data records associated with a selected cloud services application from among a plurality of cloud service applications. The system comprises a processor implemented trusted intermediary server, wherein the trusted intermediary server is configured to (i) establish network communication with a client terminal operated by a user, (ii) select based on user input received through the client terminal, a cloud services application from among a plurality of cloud service applications, for retrieving data associated with the selected cloud services application, (iii) receive a user identifier a comprising an identifier uniquely associated with the user in the records of the selected cloud services application, (iv) generate a validation code, (v) transmit to a cloud services server associated with the selected cloud services application (a) the user identifier, and (b) the validation code—wherein the cloud services server is configured to respond to transmission of the user identifier by (c) identifying a terminal device that is associated with the user identifier, and (d) transmitting the validation code to the identified terminal device, (vi) initiate through the client terminal, a prompt for the user to input a validation code, (vii) receive from the client terminal, a code that has been input by the user at the client terminal in response to the prompt, and (viii) responsive to determining that the validation code matches the received code that has been input by the user at the client terminal (e) retrieve from a database associated with the selected cloud services application, data that is associated with both of the user and the selected cloud services application, and (f) enable the user to access the retrieved data through the client terminal.

In another embodiment, the invention provides a computer program product for enabling secure network access to data records associated with a selected cloud services application from among a plurality of cloud service applications, through a trusted intermediary server. The computer program product comprises a non-transitory computer readable medium having a computer readable program code embodied therein, the computer readable program code comprising instructions for implementing the steps of (i) establishing network communication between the trusted intermediary server and a client terminal operated by a user, (ii) selecting based on user input received through the client terminal, a cloud services application from among a plurality of cloud service applications, for retrieving data associated with the selected cloud services application, (iii) receiving a user identifier a comprising an identifier uniquely associated with the user in the records of the selected cloud services application, (iv) generating a validation code, (v) transmitting to a cloud services server associated with the selected cloud services application (a) the user identifier, and (b) the validation code—wherein the cloud services server is configured to respond to transmission of the user identifier by (c) identifying a terminal device that is associated with the user identifier, and (d) transmitting the validation code to the identified terminal device, (vi) initiating through the client terminal, a prompt for the user to input a validation code, (vii) receiving from the client terminal, a code that has been input by the user at the client terminal in response to the prompt, and (viii) responsive to determining that the validation code matches the received code that has been input by the user at the client terminal (e) retrieving from a database associated with the selected cloud services application, data that is associated with both of the user and the selected cloud services application, and (f) enabling the user to access the retrieved data through the client terminal.

DESCRIPTION OF THE INVENTION

The present invention relates to the domain of cloud based software services. In particular, the present invention provides methods, systems and computer program products for accessing data for enabling secure access to the data or records of a cloud services server through a trusted intermediary server.

Figure 1:
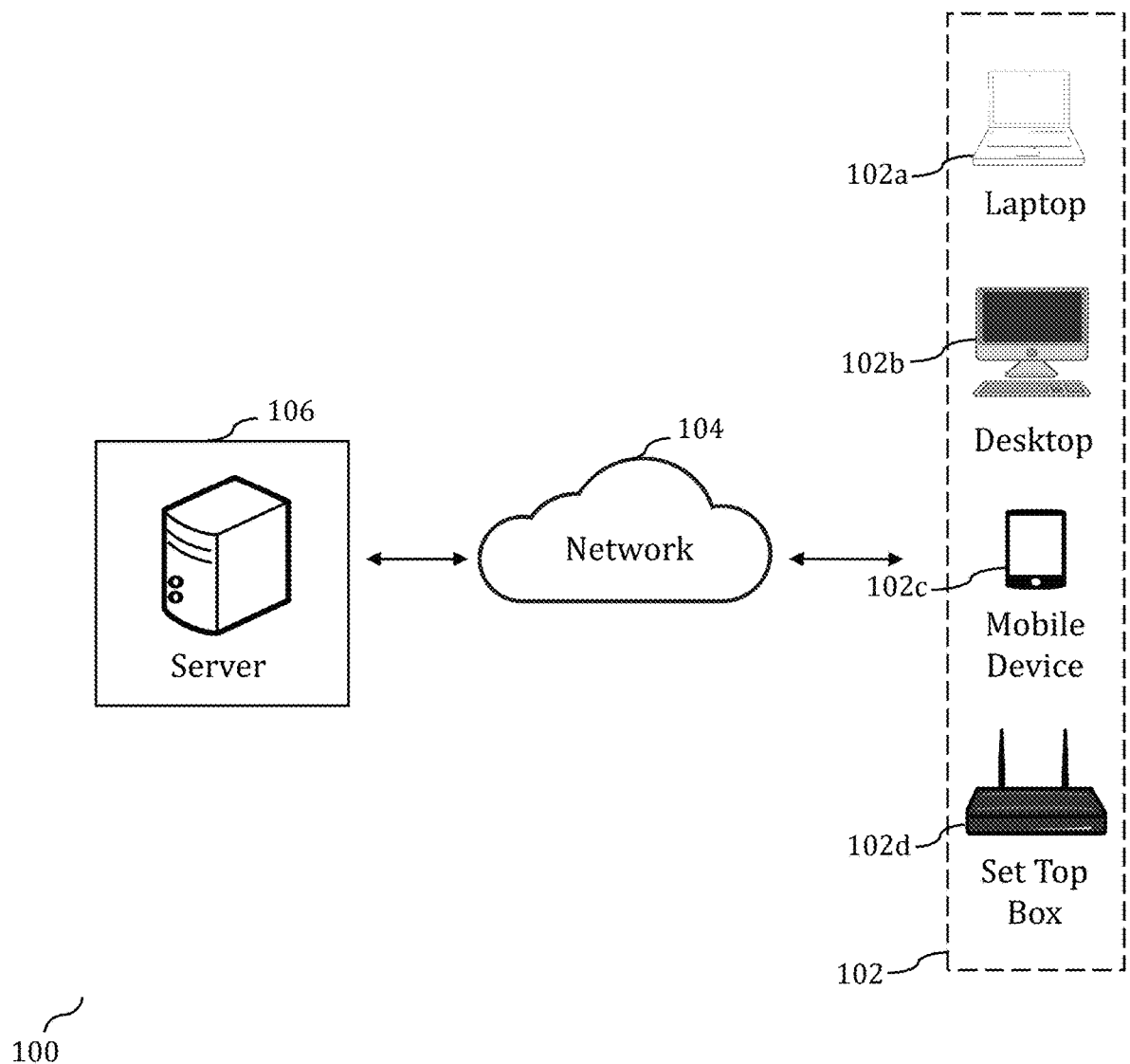
FIGS. 1 and 2 illustrate system environments of a kind that may be used to implement the teachings of the present invention.

The methods of the present invention may be implemented within a system environment 100 of a kind illustrated in FIG. 1. System environment 100 comprises one or more client devices 102 (for example, any of laptop 102a, desktop 102b, mobile device 102c and/or set top box 102d) interfacing through network 104, with a server 106. The server 106 may be configured to support a conventional server-client arrangement, where the client device 102 may communicate with server 106 for any one or more of several purposes, including for example downloading a software application, configuring the downloaded software application, updating the downloaded software application, or enabling client device 102 to upload or download data.

Alternatively, server 106 may be configured to provide cloud based service(s) to a requesting client device 102, wherein a software application required by client device 102 is installed and run on server 106, and video and audio output data from the software application is streamed to and rendered on client device 102. The inputs received from a user or operator of the client device 102 are in turn transmitted back to server 106 and are used to control execution of the software application that is running on the server 106.

So for example, in a cloud based gaming environment, a game software is installed and run on a hardware device configured to run the game software—and which is integrated or coupled with server 106. The game software is run on the hardware device and video and audio gameplay data is streamed from the hardware device (optionally through server 106) to a client device 102, where it is rendered for display and/or audio playback. A gameplayer who is operating client device 102 uses the interface controls of client device 102 to provide gameplay inputs—which are streamed back to the hardware device on which the game software is being executed and is used as gameplay control inputs for the game software that is being run on said hardware device.

Figure 2:
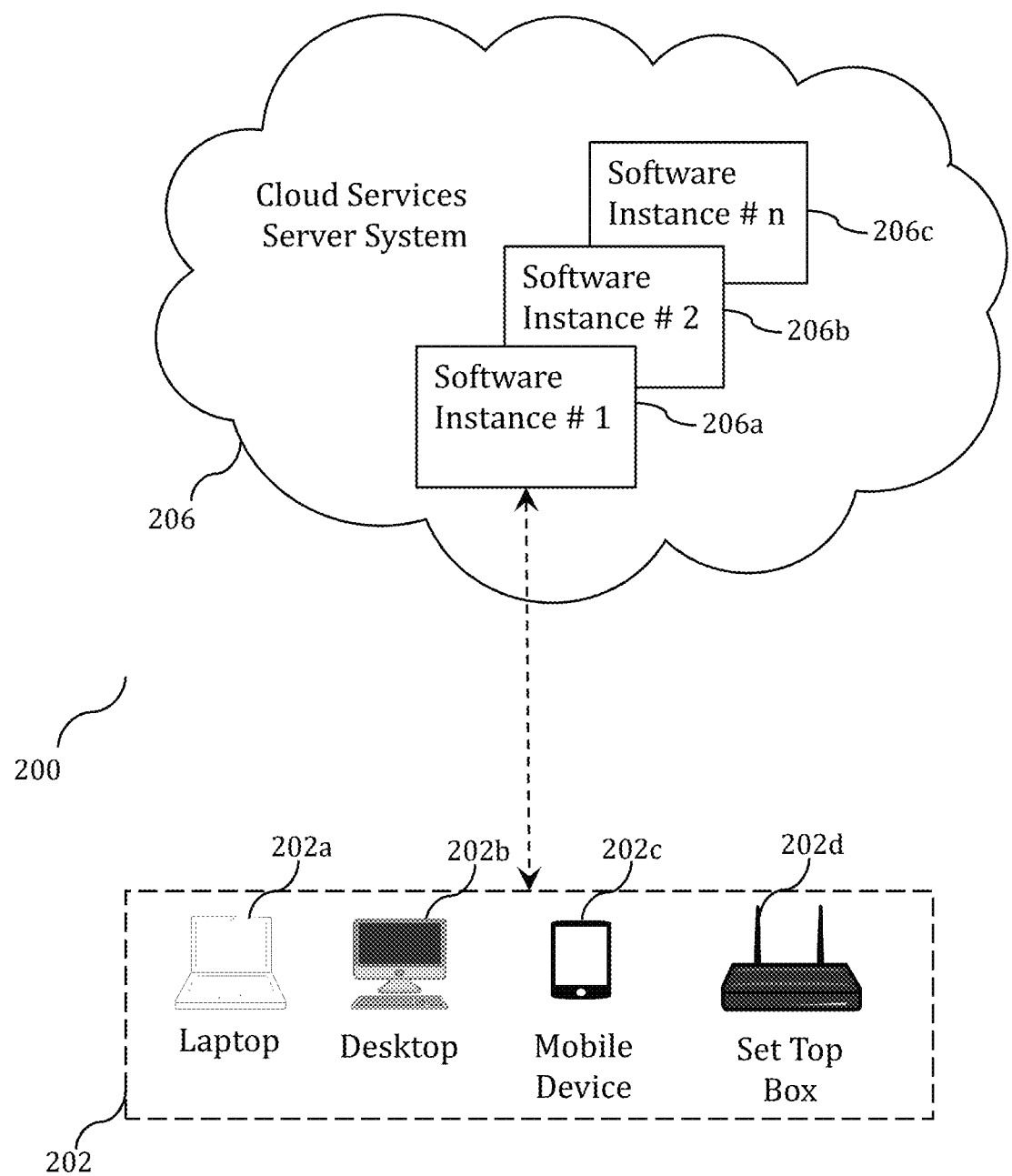

FIG. 2 illustrates a more specific embodiment of a system environment 300 of the kind that has been more generally described in connection with FIG. 1.

System environment 200 comprises one or more client devices 202 (for example, any of laptop 202a, desktop 202b, mobile device 202c and/or set top box 202d) interfacing through a communication network such as a data network or the internet (not shown), with a cloud services server system 206. The cloud services server system 206 may comprise (or may be coupled with) a plurality of discrete or distinct hardware systems—each of which is configured to be provisioned with, and to instantiate and run a discrete instance of one or more software applications. As a result, cloud services server system 206 may utilize the plurality of discrete or distinct hardware systems to simultaneously run software instance #1 (206a), software instance #2 (206b), up to software instance #n (206c)—such that video and/or audio data from each of these software instance 206a to 206c may be streamed to one or more requesting client devices 202a to 202d.

By way of an example:
client device 202a may request cloud services server system 206 for cloud based execution of a first software application—and cloud services server system 206 may respond by (i) instantiating a first instance of this first software application to run on a first hardware system, and (ii) streaming video and/or audio data from the first instance of the first software application to client device 202a.

client device 202b may request cloud services server system 206 for cloud based execution of a second software application (which may be the same as the first software application, or may comprise a different software application)—and cloud services server system 206 may respond by (i) instantiating a second instance of this second software application to run on a second hardware system, and (ii) streaming video and/or audio data from the second instance of the second software application to client device 202a client device 202c may request cloud services server system 206 for cloud based execution of an $n^{th}$ software application (which may be the same as either of the first or second software applications, or may be different from both)—and cloud services server system 206 may respond by (i) instantiating an $n^{th}$ instance of this $n^{th}$ software application to run on an $n^{th}$ hardware system, and (ii) streaming video and/or audio data from the $n^{th}$ instance of the $n^{th}$ software application to client device 202c.

Figure 3:
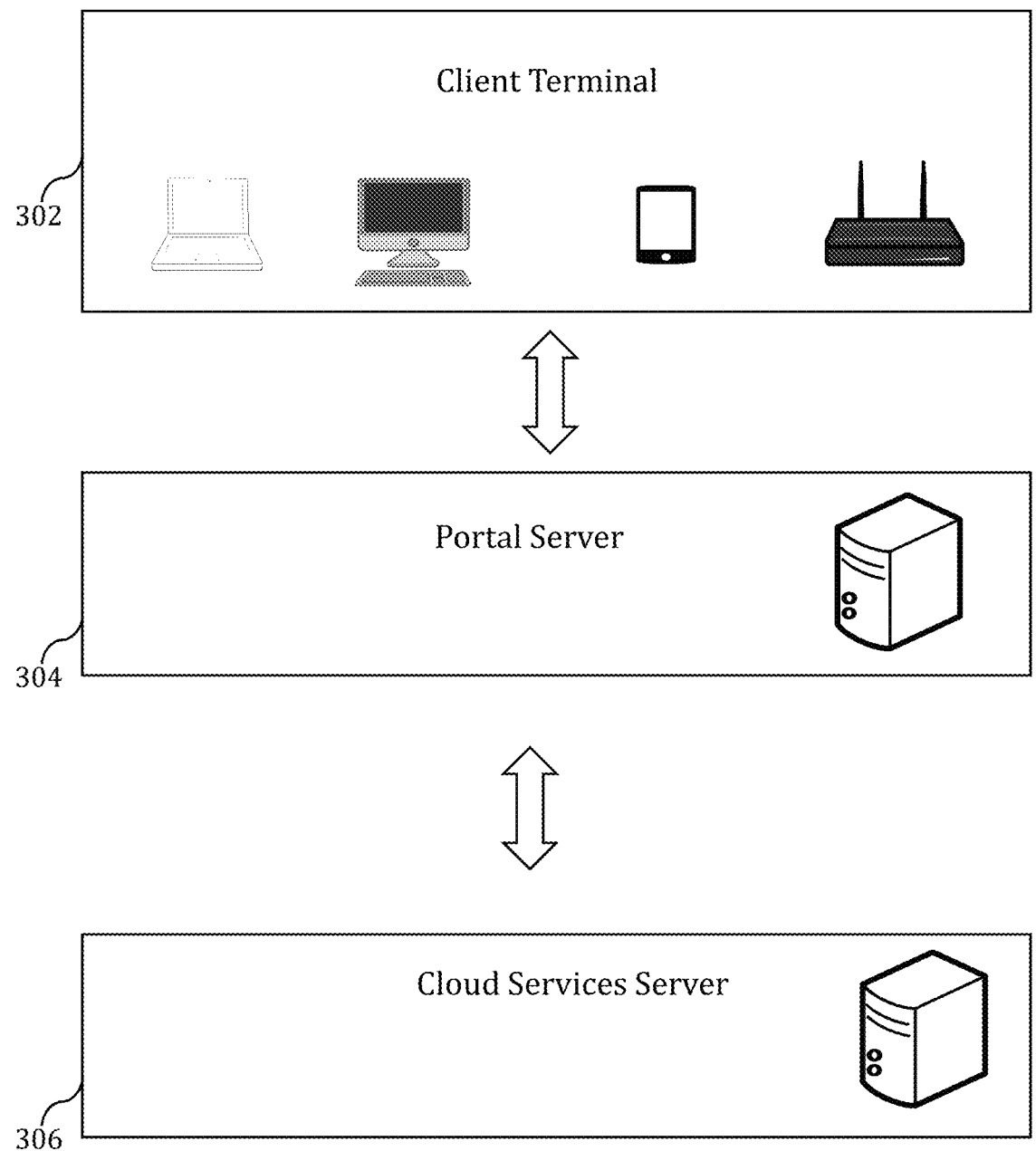
FIG. 3 illustrates an exemplary configuration for a system configured to enable centralized access/retrieval of data or records that are associated with any of a plurality of cloud services, through a unified portal or a unified data management platform.

FIG. 3 illustrates an exemplary configuration for a system 300 configured to enable centralized access/retrieval of data or records that are associated with any of a plurality of cloud services, through a unified portal or a unified data management platform. In an embodiment, the unified portal or unified data management platform may be implemented by a trusted intermediate server or a trusted intermediate platform.

As shown in FIG. 3, system 300 may comprise a client terminal 302, a portal server 304 and a cloud services server 306.

Client terminal 302 may comprise any processor based client device or terminal through which a user accesses cloud based services. In various examples, client terminal 302 may include any of a laptop, desktop, mobile device or set top box that is configured to interface through a communication network such as a data network or the internet, with portal server 304.

Portal server 304 comprises a server configured to implement a unified portal or a unified data management platform for the purpose of enabling clients or client terminals (e.g. client terminal 302) to access/retrieve of data or records that are associated with any of a plurality of cloud services. Methods according to the present invention, by which portal server implements this functionality, are discussed in more detail below.

Cloud services server 306 may comprise any processor based server(s) having one or more cloud based services or cloud services application instance(s) being implemented thereon—wherein cloud based services from a cloud services application instance that is under execution are transmitted or delivered over a communication network from cloud services server 306 to a client terminal 302.

The system 300 of FIG. 3 may be used to implement any of the methods described subsequently in this written description.

Figure 4:
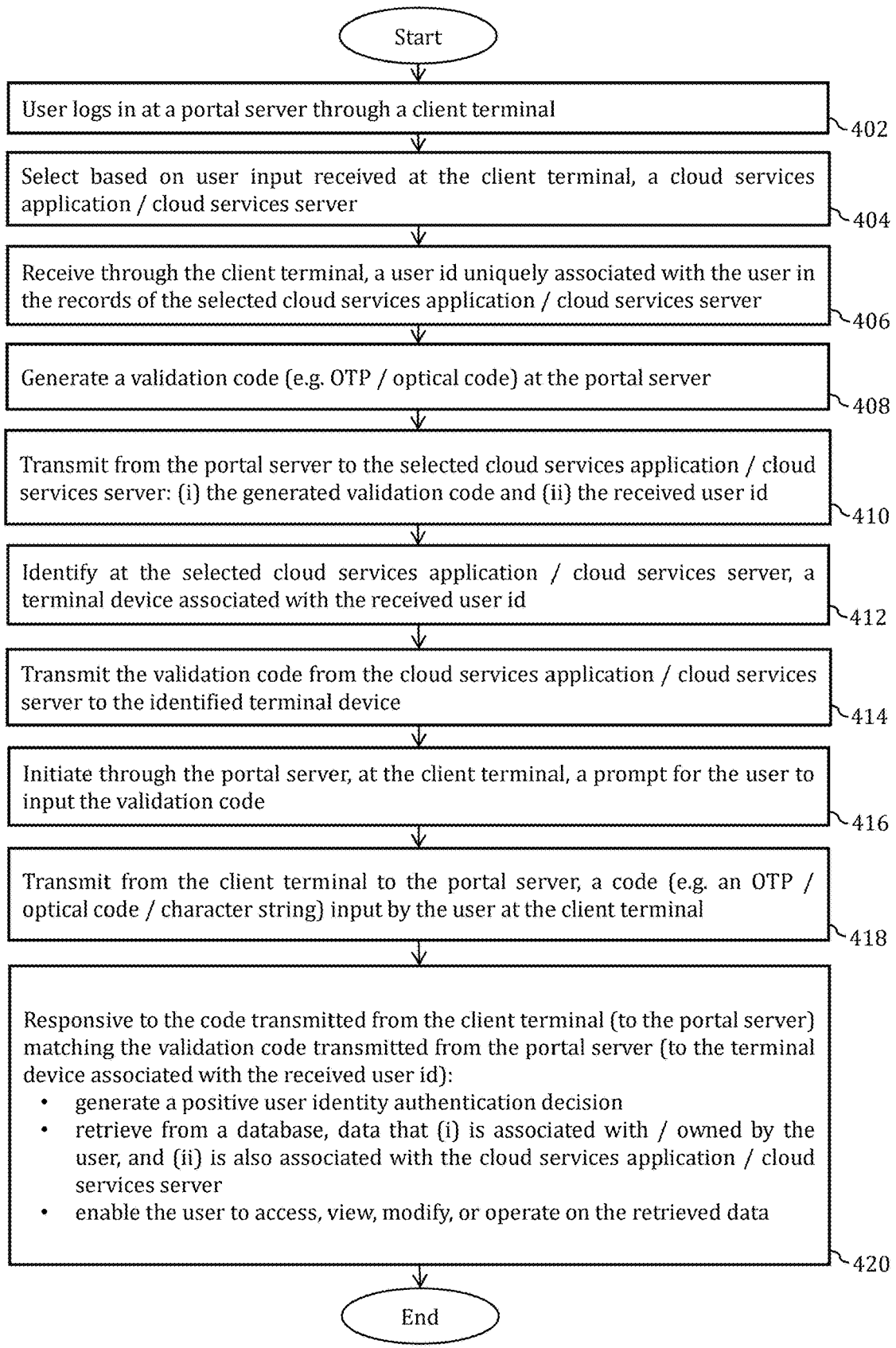
FIG. 4 is a flowchart illustrating method steps involved in enabling centralized access/retrieval of data or records that are associated with any of a plurality of cloud services, through a unified portal or a unified data management platform.

FIG. 4 is a flowchart illustrating method steps involved in enabling centralized access/retrieval of data or records that are associated with any of a plurality of cloud services, through a unified portal or a unified data management platform. In an embodiment, the unified portal or unified data management platform may be implemented at or through a portal server. In an embodiment, the portal server may be implemented within or may comprise a part of portal server 304 of FIG. 3. In an embodiment, the unified portal or unified data management platform may be implemented by a trusted intermediate server or a trusted intermediate platform.

At step 402, a user logs in to the portal server 304 through a client terminal 302.

Step 404 comprises selecting, based on user input received at client terminal 302, a cloud services application/cloud services server 306. By selecting a cloud services application/cloud services server 306, the user seeks to retrieve or view data or data records or any form of digital content that is associated with or is stored or controlled by the selected cloud services application/cloud services server 306.

Step 406 comprises receiving by way of user input through client terminal 302, a user id. The received user id comprises an identifier uniquely associated with the user in the records of the selected cloud services application/cloud services server 306.

Step 408 comprises generating a validation code (e.g. a one-time-password (OTP)/optical code (barcode or QR code or other optical code)) at portal server 304.

Step 410 comprises transmitting from the portal server 304 to the selected cloud services application/cloud services server 306 (i) the generated validation code and (ii) the received user id.

Step 412 comprises identifying at the selected cloud services application/cloud services server 306, a terminal device associated with the received user id—wherein identification of the terminal device is achieved by parsing data records associated with the received user id to identify a terminal device (e.g. a mobile communication device or a computing device) that is associated with said user id.

Step 414 comprises transmitting the generated validation code from the cloud services application/cloud services server 306 to the identified terminal device.

Step 416 thereafter comprises initiating through the portal server 304, at the client terminal 302, a prompt for the user to input the validation code that has been transmitted to the identified terminal device that is associated with the user id.

Step 418 comprises transmitting from client terminal 302 to the portal server, a code (e.g. an OTP/optical code/character string) input by the user at the client terminal 302 in response to the prompt for the user to input the validation code.

Responsive to the code that is transmitted from the client terminal 302 (to the portal server 304) being found to match the validation code that has been transmitted from the portal server 304 (to the identified terminal device associated with the received user id), step 420 comprises:

generating a positive user identity authentication decision,
    retrieving from a database, data or data records or digital content that (i) is associated with/owned by the user, and (ii) is also associated with the cloud services application/cloud services server 306, and/or
    enabling the user to access, view, modify and/or operate on the retrieved data.

Figure 5:
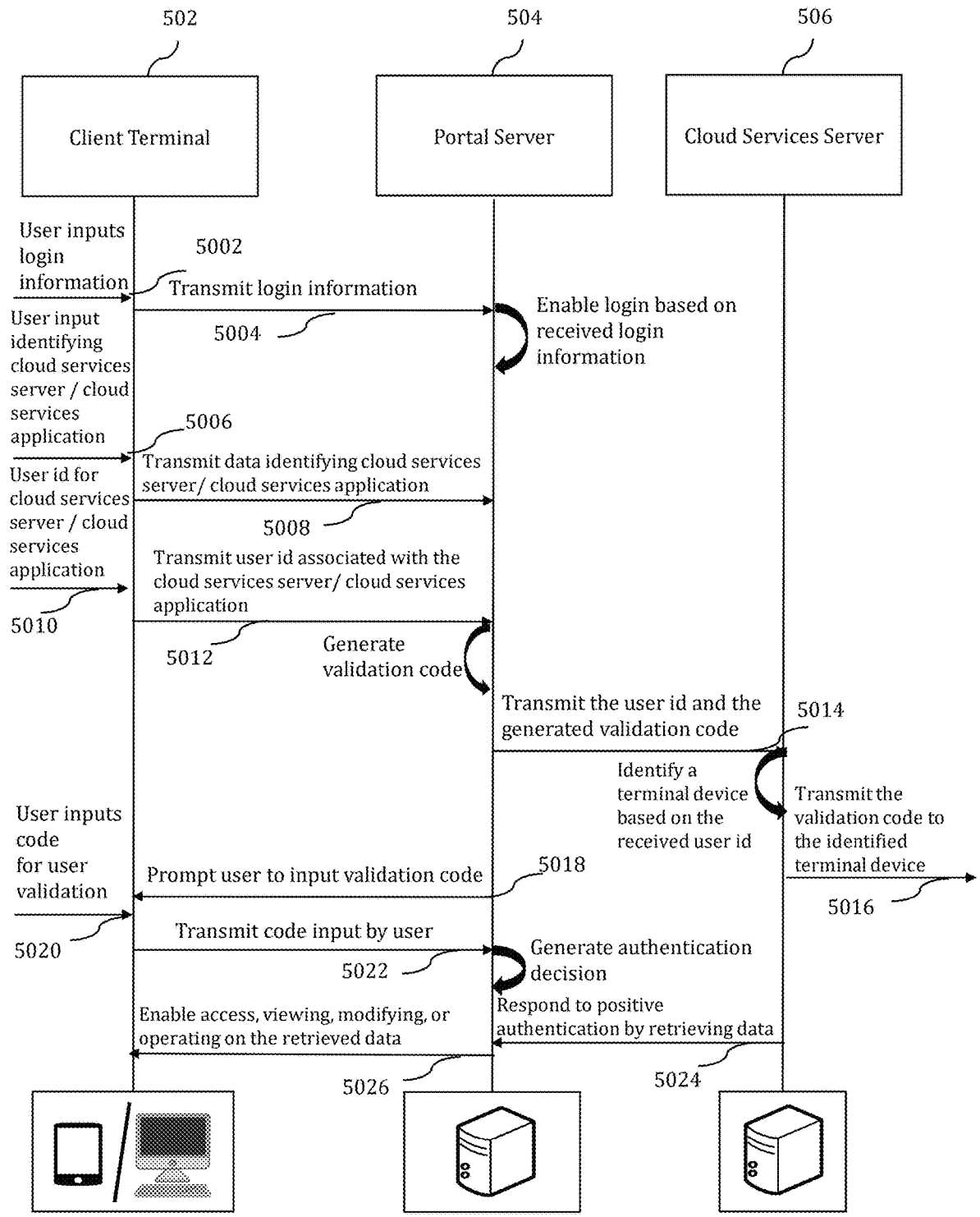
FIG. 5 is a communication flow diagram illustrating communication flow between system entities for implementing the method of FIG. 4.

FIG. 5 is a communication flow diagram illustrating communication flow between system entities for implementing the method of FIG. 4.

At step 5002, a user inputs login information at client terminal 502.

Step 5004 comprises transmitting the login information from client terminal 502 to portal server 504. Portal server 504 uses the received login information to authenticate the user's identity—and if the user is found to have an account/access permissions at a unified portal or a unified data management platform implemented at portal server 504, the login information is used to enable the user to login to the unified portal or the unified data management platform.

At step 5006 user input is received at client terminal 502, identifying a cloud services application/cloud services server 506. By identifying or selecting a cloud services application/cloud services server 506, the user seeks to retrieve or view for purchase selection, data or data records or digital content associated with or stored or controlled by the identified cloud services application/cloud services server 506.

Step 5008 comprises transmitting data identifying said cloud services application/cloud services server 506 from client terminal 502 to portal server 504.

Step 5010 comprises receiving by way of user input through client terminal 502, a user id. The received user id comprises an identifier uniquely associated with the user in the records of the selected cloud services application/cloud services server 506.

Portal server 504 thereafter generates a validation code (e.g. an OTP/optical code).

Step 5014 comprises transmitting from the portal server 504 to the selected cloud services application/cloud services server 506 (*i*) the generated validation code and (ii) the received user id.

The cloud services application/cloud services server 506 identifies a terminal device associated with the received user id—wherein identification of the terminal device is achieved by parsing data records associated with the received user id to identify a terminal device (e.g. a mobile communication device or a computing device) that is associated with said user id.

Step 5016 comprises transmitting the generated validation code from the cloud services application/cloud services server 506 to the identified terminal device.

Step 5018 thereafter comprises initiating through the portal server 504, at client terminal 502, a prompt for the user to input the validation code that has been transmitted to the identified terminal device that is associated with the user id.

Step 5020 comprises receiving at client terminal 502, a code input by the user in response to the prompt to input the validation code. Step 5022 comprises transmitting the code input by the user, from client terminal 502 to portal server 504.

Portal server 504 thereafter matches the code received from client terminal 502 against the generated validation code, and generates an authentication decision based on the matching step. In an embodiment, responsive to the code that is transmitted from client terminal 502 (to the portal server 504) being found to match the validation code that has been transmitted from the portal server 504 (to the identified terminal device associated with the received user id), a positive user identity authentication decision is generated.

Thereafter, in response to a positive user identity authentication decision, step 5024 comprises retrieving from a database associated with or within the cloud services application/cloud services server 506, data or data record(s) or digital content that (i) is associated with/owned by the user, and (ii) is also associated with the cloud services application/cloud services server 1106.

Step 5026 then enables the user to access, view, modify or operate on the retrieved data, data record(s) and/or digital content through client terminal 502.

Figure 6:
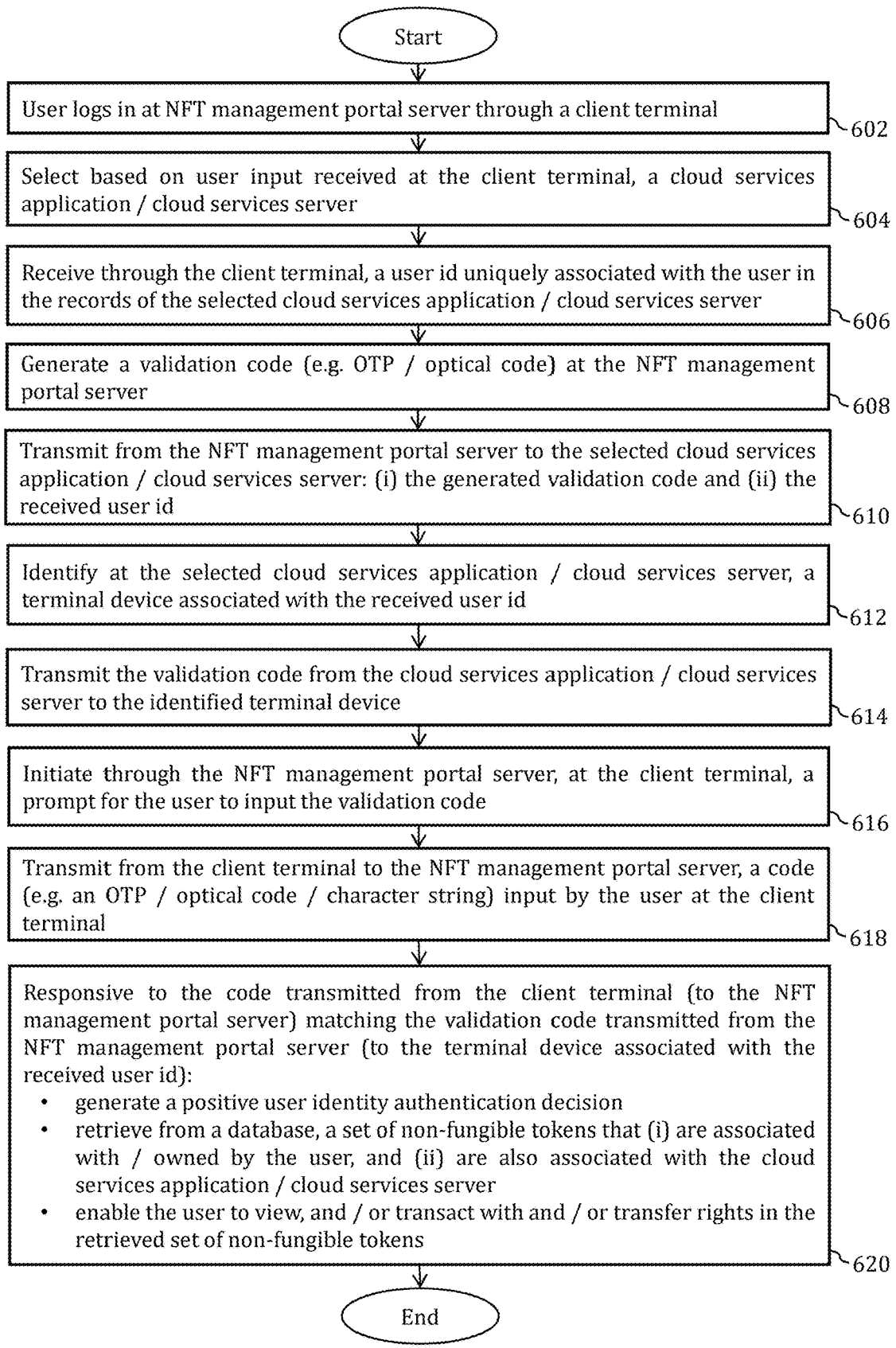
FIG. 6 is a flowchart illustrating method steps involved in embodiment of the method of FIG. 4, wherein the portal server is a NFT (non-fungible token) management portal server.

FIG. 6 is a flowchart illustrating method steps involved in embodiment of the method of FIG. 4, wherein (i) the portal server is a NFT (non-fungible token) management portal server configured to implement a unified NFT management portal or a unified NFT management platform and (ii) the cloud services application/cloud services server is a cloud services application/cloud services server that generates, stores, or controls non-fungible tokens associated with cloud based services provided by said cloud services application/cloud services server. In an embodiment of FIG. 6, the NFT management portal server may be implemented within or may comprise a part of portal server 304 of FIG. 3. In an embodiment, the unified portal or unified data management platform may be implemented by a trusted intermediate server or a trusted intermediate platform.

At step 602, a user logs in to the NFT management portal server through a client terminal 302.

Step 604 comprises selecting, based on user input received at client terminal 302, a cloud services application/cloud services server 306. By selecting a cloud services application/cloud services server, the user seeks to retrieve or view for purchase selection, non-fungible token(s) that include media content associated with or generated based on the selected cloud services application/cloud services server 306.

Step 606 comprises receiving byway of user input through client terminal 302, a user id. The received user id comprises an identifier uniquely associated with the user in the records of the selected cloud services application/cloud services server 306.

Step 608 comprises generating a validation code (e.g. a one-time-password (OTP)/optical code (barcode or QR code or other optical code)) at the NFT management portal server 304.

Step 610 comprises transmitting from the NFT management portal server 304 to the selected cloud services application/cloud services server 306 (i) the generated validation code and (ii) the received user id.

Step 612 comprises identifying at the selected cloud services application/cloud services server 306, a terminal device associated with the received user id—wherein identification of the terminal device is achieved by parsing data records associated with the received user id to identify a terminal device (e.g. a mobile communication device or a computing device) that is associated with said user id.

Step 614 comprises transmitting the generated validation code from the cloud services application/cloud services server 306 to the identified terminal device.

Step 616 thereafter comprises initiating through the NFT management portal server 304, at the client terminal 302, a prompt for the user to input the validation code that has been transmitted to the identified terminal device that is associated with the user id.

Step 618 comprises transmitting from client terminal 302 to the NFT management portal server 304, a code (e.g. an OTP/optical code/character string) input by the user at the client terminal 302 in response to the prompt for the user to input the validation code.

Responsive to the code that is transmitted from the client terminal 302 (to the NFT management portal server 304) being found to match the validation code that has been transmitted from the NFT management portal server 304 (to the identified terminal device associated with the received user id), step 620 comprises:

generating a positive user identity authentication decision,
retrieving from a database, a set of non-fungible tokens that (i) are associated with/owned by the user, and (ii) are also associated with the cloud services application/cloud services server 306, and/or
enabling the user to view, and/or transact with and/or transfer rights in the retrieved set of non-fungible tokens.

Figure 7:
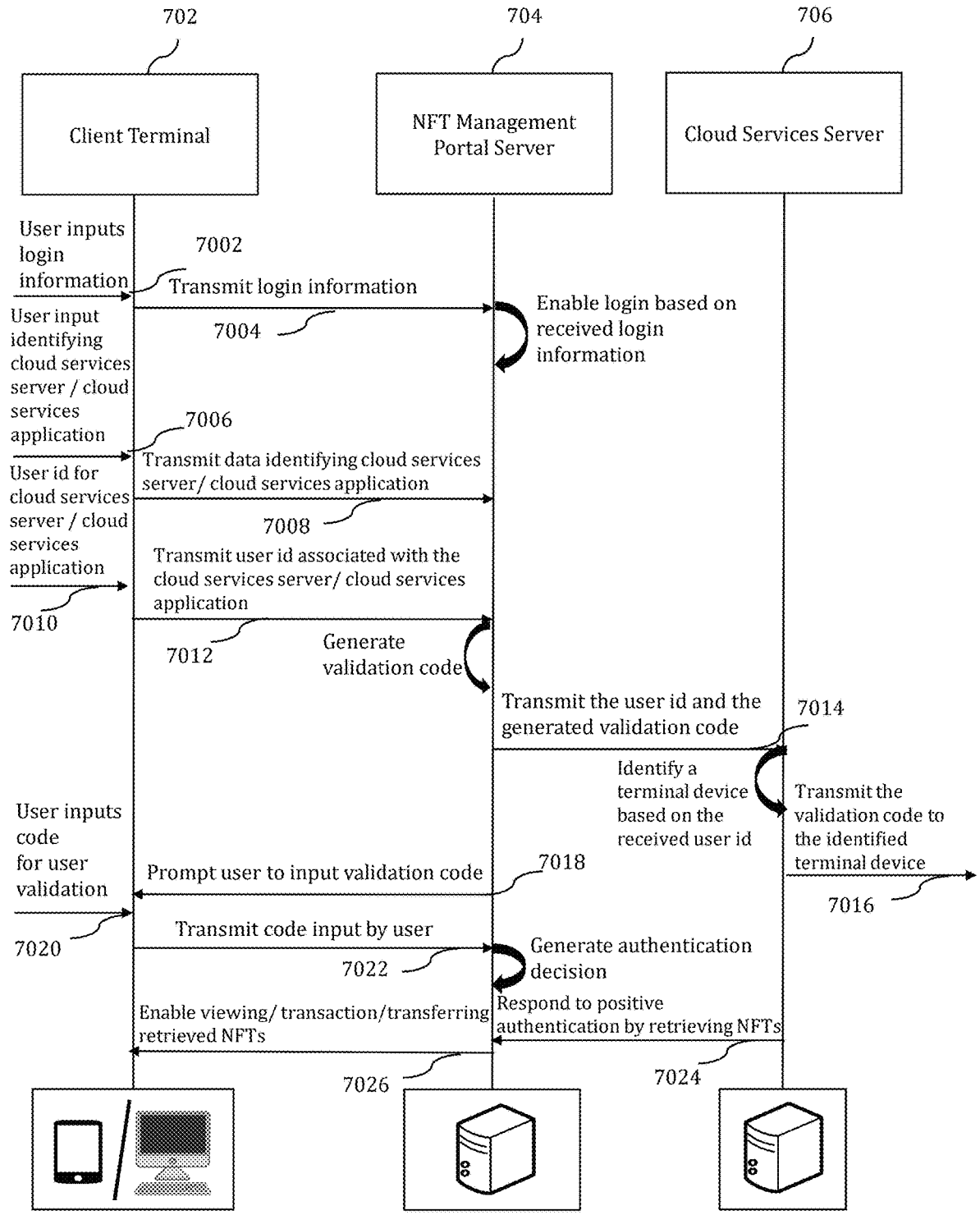
FIG. 7 is a communication flow diagram illustrating communication flow between system entities for implementing the method of FIG. 6.

FIG. 7 is a communication flow diagram illustrating communication flow between system entities for implementing the method of FIG. 6.

At step 7002, a user inputs login information at client terminal 702.

Step 7004 comprises transmitting the login information from client terminal 702 to NFT management portal server 704. NFT management portal server 704 uses the received login information to authenticate the user's identity—and if the user is found to have an account/access permissions at the NFT management portal, the login information is used to enable the user to login to the NFT management portal.

At step 7006 user input is received at client terminal 702, identifying a cloud services application/cloud services server. By identifying or selecting a cloud services application/cloud services server, the user seeks to retrieve or view for purchase selection, non-fungible token(s) that include media content associated with or generated based on the identified cloud services application/cloud services server.

Step 7008 comprises transmitting data identifying said cloud services application/cloud services server from client terminal 702 to NFT management portal server 704.

Step 7010 comprises receiving by way of user input through client terminal 702, a user id. The received user id comprises an identifier uniquely associated with the user in the records of the selected cloud services application/cloud services server.

NFT management portal server 704 thereafter generates a validation code (e.g. an OTP/optical code).

Step 7014 comprises transmitting from the NFT management portal server 704 to the selected cloud services application/cloud services server 706 (i) the generated validation code and (ii) the received user id.

The cloud services application/cloud services server 706 identifies a terminal device associated with the received user id—wherein identification of the terminal device is achieved by parsing data records associated with the received user id to identify a terminal device (e.g. a mobile communication device or a computing device) that is associated with said user id.

Step 7016 comprises transmitting the generated validation code from the cloud services application/cloud services server 706 to the identified terminal device.

Step 7018 thereafter comprises initiating through the NFT management portal server 704, at client terminal 702, a prompt for the user to input the validation code that has been transmitted to the identified terminal device that is associated with the user id.

Step 7020 comprises receiving at client terminal 702, a code input by the user in response to the prompt to input the validation code. Step 7022 comprises transmitting the code input by the user, from client terminal 702 to NFT management portal server 704.

NFT management portal server 704 thereafter matches the code received from client terminal 702 against the generated validation code, and generates an authentication decision based on the matching step. In an embodiment, responsive to the code that is transmitted from client terminal 702 (to the NFT management portal server 704) being found to match the validation code that has been transmitted from the NFT management portal server 704 (to the identified terminal device associated with the received user id), a positive user identity authentication decision is generated.

Thereafter, in response to a positive user identity authentication decision, step 7024 comprises retrieving from a database associated with or within the cloud services application/cloud services server 706, a set of non-fungible tokens that (i) are associated with/owned by the user, and (ii) are also associated with the cloud services application/cloud services server 706.

Step 7026 then enables the user to view, and/or transact with and/or transfer rights in the retrieved set of non-fungible tokens through client terminal 702.

In an embodiment, the invention provides a method for enabling secure network access to data records associated with a selected cloud services application from among a plurality of cloud service applications, through a trusted intermediary server. The method comprises (i) establishing network communication between the trusted intermediary server and a client terminal operated by a user, (ii) selecting based on user input received through the client terminal, a cloud services application from among a plurality of cloud service applications, for retrieving data associated with the selected cloud services application, (iii) receiving a user identifier a comprising an identifier uniquely associated with the user in the records of the selected cloud services application, (iv) generating a validation code, (v) transmitting to a cloud services server associated with the selected cloud services application (a) the user identifier, and (b) the validation code—wherein the cloud services server is configured to respond to transmission of the user identifier by (c) identifying a terminal device that is associated with the user identifier, and (d) transmitting the validation code to the identified terminal device, (vi) initiating through the client terminal, a prompt for the user to input a validation code, (vii) receiving from the client terminal, a code that has been input by the user at the client terminal in response to the prompt, and (viii) responsive to determining that the validation code matches the received code that has been input by the user at the client terminal (e) retrieving from a database associated with the selected cloud services application, data that is associated with both of the user and the selected cloud services application, and (f) enabling the user to access the retrieved data through the client terminal.

In an embodiment of the method, (i) the trusted intermediary server is a non-fungible token management portal server configured to implement a non-fungible non-fungible token management portal, (ii) the selected cloud services application is a software application that generates or stores non-fungible tokens associated with cloud based services provided by the selected cloud services application, and (iii) the retrieved data comprises a set of non-fungible tokens that are associated with both of the user and the selected cloud services application.

In a further embodiment of the method, each non-fungible token within the set of non-fungible tokens includes media content associated with or generated by the selected cloud services application.

In another embodiment of the method, the step of identifying the terminal device that is associated with the user identifier comprises parsing data records associated with the user identify to identify a terminal device that is associated with said user identifier.

In a specific method embodiment, enabling the user to access the retrieved data through the client terminal comprise displaying the retrieved data on a display at the client terminal and enabling the user to view, modify or operate on the retrieved data.

The invention also provides a system for enabling secure network access to data records associated with a selected cloud services application from among a plurality of cloud service applications. The system comprises a processor implemented trusted intermediary server, wherein the trusted intermediary server is configured to (i) establish network communication with a client terminal operated by a user, (ii) select based on user input received through the client terminal, a cloud services application from among a plurality of cloud service applications, for retrieving data associated with the selected cloud services application, (iii) receive a user identifier a comprising an identifier uniquely associated with the user in the records of the selected cloud services application, (iv) generate a validation code, (v) transmit to a cloud services server associated with the selected cloud services application (a) the user identifier, and (b) the validation code—wherein the cloud services server is configured to respond to transmission of the user identifier by (c) identifying a terminal device that is associated with the user identifier, and (d) transmitting the validation code to the identified terminal device, (vi) initiate through the client terminal, a prompt for the user to input a validation code, (vii) receive from the client terminal, a code that has been input by the user at the client terminal in response to the prompt, and (viii) responsive to determining that the validation code matches the received code that has been input by the user at the client terminal (e) retrieve from a database associated with the selected cloud services application, data that is associated with both of the user and the selected cloud services application, and (f) enable the user to access the retrieved data through the client terminal.

In an embodiment of the system, (i) the trusted intermediary server is a non-fungible token management portal server configured to implement a non-fungible non-fungible token management portal, (ii) the selected cloud services application is a software application that generates or stores non-fungible tokens associated with cloud based services provided by the selected cloud services application, and (iii) the retrieved data comprises a set of non-fungible tokens that are associated with both of the user and the selected cloud services application.

In another embodiment of the system, each non-fungible token within the set of non-fungible tokens includes media content associated with or generated by the selected cloud services application.

In a further embodiment of the system, identifying the terminal device that is associated with the user identifier comprises parsing data records associated with the user identify to identify a terminal device that is associated with said user identifier.

In an additional embodiment of the system, enabling the user to access the retrieved data through the client terminal comprise displaying the retrieved data on a display at the client terminal and enabling the user to view, modify or operate on the retrieved data.

The invention further provides a computer program product for enabling secure network access to data records associated with a selected cloud services application from among a plurality of cloud service applications, through a trusted intermediary server. The computer program product comprises a non-transitory computer readable medium having a computer readable program code embodied therein, the computer readable program code comprising instructions for implementing the steps of (i) establishing network communication between the trusted intermediary server and a client terminal operated by a user, (ii) selecting based on user input received through the client terminal, a cloud services application from among a plurality of cloud service applications, for retrieving data associated with the selected cloud services application, (iii) receiving a user identifier a comprising an identifier uniquely associated with the user in the records of the selected cloud services application, (iv) generating a validation code, (v) transmitting to a cloud services server associated with the selected cloud services application (a) the user identifier, and (b) the validation code—wherein the cloud services server is configured to respond to transmission of the user identifier by (c) identifying a terminal device that is associated with the user identifier, and (d) transmitting the validation code to the identified terminal device, (vi) initiating through the client terminal, a prompt for the user to input a validation code, (vii) receiving from the client terminal, a code that has been input by the user at the client terminal in response to the prompt, and (viii) responsive to determining that the validation code matches the received code that has been input by the user at the client terminal (e) retrieving from a database associated with the selected cloud services application, data that is associated with both of the user and the selected cloud services application, and (f) enabling the user to access the retrieved data through the client terminal.

Figure 8:
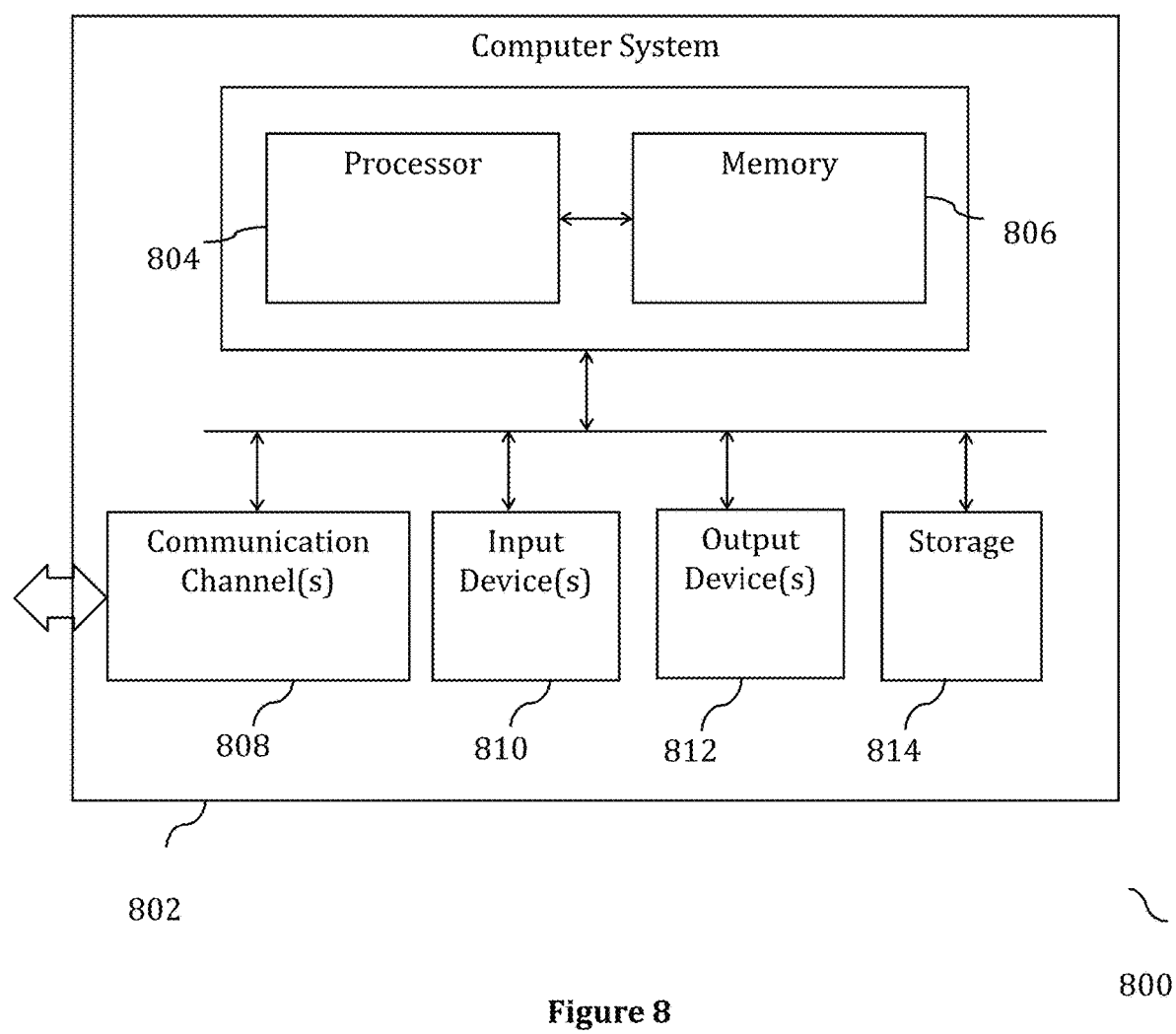
FIG. 8 illustrates an exemplary system for implementing the present invention.

FIG. 8 illustrates an exemplary system 800 for implementing the present invention. The illustrated system 800 comprises computer system 802 which in turn comprises one or more processors 804 and at least one memory 806. Processor 804 is configured to execute program instructions—and may be a real processor or a virtual processor. It will be understood that computer system 802 does not suggest any limitation as to scope of use or functionality of described embodiments. The computer system 802 may include, but is not be limited to, one or more of a general-purpose computer, a programmed microprocessor, a microcontroller, an integrated circuit, and other devices or arrangements of devices that are capable of implementing the steps that constitute the method of the present invention. Exemplary embodiments of a computer system 802 in accordance with the present invention may include one or more servers, desktops, laptops, tablets, smart phones, mobile phones, mobile communication devices, tablets, phablets and personal digital assistants. In an embodiment of the present invention, the memory 806 may store software for implementing various embodiments of the present invention. The computer system 802 may have additional components. For example, the computer system 802 may include one or more communication channels 808, one or more input devices 810, one or more output devices 812, and storage 814. An interconnection mechanism (not shown) such as a bus, controller, or network, interconnects the components of the computer system 802. In various embodiments of the present invention, operating system software (not shown) provides an operating environment for various softwares executing in the computer system 802 using a processor 804, and manages different functionalities of the components of the computer system 802.

The communication channel(s) 808 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 810 may include, but is not limited to, a touch screen, a keyboard, mouse, pen, joystick, trackball, a voice device, a scanning device, or any another device that is capable of providing input to the computer system 802. In an embodiment of the present invention, the input device(s) 810 may be a sound card or similar device that accepts audio input in analog or digital form. The output device(s) 812 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 802.

The storage 814 may include, but is not limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 802. In various embodiments of the present invention, the storage 814 may contain program instructions for implementing any of the described embodiments.

In an embodiment of the present invention, the computer system 802 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 802. The method described herein is typically implemented as a computer program product, comprising a set of program instructions that is executed by the computer system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computer system 802, via a modem or other interface device, over either a tangible medium, including but not limited to optical or analogue communications channel(s) 808. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The invention accordingly enables straightforward, secure and centralized access or retrieval of data or records that are associated with any of a plurality of cloud services, through a unified portal or a unified data management platform.

While the exemplary embodiments of the present invention are described and illustrated herein, it will be appreciated that they are merely illustrative. It will be understood by those skilled in the art that various modifications in form and detail may be made therein without departing from or offending the scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

I claim:

1. A method for enabling secure network access to data records associated with a selected cloud services application from among a plurality of cloud service applications, through a trusted intermediary server, the method comprising:
   establishing network communication between the trusted intermediary server and a client terminal operated by a user;
   selecting based on user input received through the client terminal, a cloud services application from among a plurality of cloud service applications, for retrieving data associated with the selected cloud services application;
   receiving a user identifier a comprising an identifier uniquely associated with the user in the records of the selected cloud services application;
   generating a validation code;
   transmitting to a cloud services server associated with the selected cloud services application:
      the user identifier; and
      the validation code;
   wherein the cloud services server is configured to respond to transmission of the user identifier by:
      identifying a terminal device that is associated with the user identifier; and
      transmitting the validation code to the identified terminal device;
   initiating through the client terminal, a prompt for the user to input a validation code;
   receiving from the client terminal, a code that has been input by the user at the client terminal in response to the prompt; and
   responsive to determining that the validation code matches the received code that has been input by the user at the client terminal:
      retrieving from a database associated with the selected cloud services application, data that is associated with both of the user and the selected cloud services application; and
      enabling the user to access the retrieved data through the client terminal;
   wherein:
      the trusted intermediary server is a non-fungible token management portal server configured to implement a non-fungible token management portal;
      the selected cloud services application is a software application that generates of stores non-fungible tokens associated with cloud based services provided by the selected cloud services application; and
      the retrieved data comprises a set of non-fungible tokens that are associated with both of the user and the selected cloud services application.

2. The method as claimed in claim 1, wherein each non-fungible token within the set of non-fungible tokens includes media content associated with or generated by the selected cloud services application.

3. The method as claimed in claim 1, wherein the step of identifying the terminal device that is associated with the user identifier comprises parsing data records associated with the user identify to identify a terminal device that is associated with said user identifier.

4. The method as claimed in claim 1, wherein enabling the user to access the retrieved data through the client terminal comprise displaying the retrieved data on a display at the client terminal and enabling the user to view, modify or operate on the retrieved data.

5. A system for enabling secure network access to data records associated with a selected cloud services application from among a plurality of cloud service applications, comprising a processor implemented trusted intermediary server, wherein the trusted intermediary server is configured to:
   establish network communication with a client terminal operated by a user;
   select based on user input received through the client terminal, a cloud services application from among a plurality of cloud service applications, for retrieving data associated with the selected cloud services application;
   receive a user identifier a comprising an identifier uniquely associated with the user in the records of the selected cloud services application;
   generate a validation code;
   transmit to a cloud services server associated with the selected cloud services application:
      the user identifier; and
      the validation code;
   wherein the cloud services server is configured to respond to transmission of the user identifier by:

identifying a terminal device that is associated with the user identifier; and
transmitting the validation code to the identified terminal device;
initiate through the client terminal, a prompt for the user to input a validation code;
receive from the client terminal, a code that has been input by the user at the client terminal in response to the prompt; and
responsive to determining that the validation code matches the received code that has been input by the user at the client terminal:
retrieve from a database associated with the selected cloud services application, data that is associated with both of the user and the selected cloud services application; and
enable the user to access the retrieved data through the client terminal;
wherein:
the trusted intermediary server is a non-fungible token management portal server configured to implement a non-fungible token management portal;
the selected cloud services application is a software application that generates or stores non-fungible tokens associated with cloud based services provided by the selected cloud services application; and
the retrieved data comprises a set of non-fungible tokens that are associated with both of the user and the selected cloud services application.

6. The system as claimed in claim 5, wherein each non-fungible token within the set of non-fungible tokens includes media content associated with or generated by the selected cloud services application.

7. The system as claimed in claim 5, wherein identifying the terminal device that is associated with the user identifier comprises parsing data records associated with the user identify to identify a terminal device that is associated with said user identifier.

8. The system as claimed in claim 5, wherein enabling the user to access the retrieved data through the client terminal comprise displaying the retrieved data on a display at the client terminal and enabling the user to view, modify or operate on the retrieved data.

9. A computer program product for enabling secure network access to data records associated with a selected cloud services application from among a plurality of cloud service applications, through a trusted intermediary server, the computer program product comprising a non-transitory computer readable medium having a computer readable program code embodied therein, the computer readable program code comprising instructions for implementing the steps of:
establishing network communication between the trusted intermediary server and a client terminal operated by a user;
selecting based on user input received through the client terminal, a cloud services application from among a plurality of cloud service applications, for retrieving data associated with the selected cloud services application;
receiving a user identifier a comprising an identifier uniquely associated with the user in the records of the selected cloud services application;
generating a validation code;
transmitting to a cloud services server associated with the selected cloud services application:
the user identifier; and
the validation code;
wherein the cloud services server is configured to respond to transmission of the user identifier by:
identifying a terminal device that is associated with the user identifier; and
transmitting the validation code to the identified terminal device;
initiating through the client terminal, a prompt for the user to input a validation code;
receiving from the client terminal, a code that has been input by the user at the client terminal in response to the prompt; and
responsive to determining that the validation code matches the received code that has been input by the user at the client terminal:
retrieving from a database associated with the selected cloud services application, data that is associated with both of the user and the selected cloud services application; and
enabling the user to access the retrieved data through the client terminal;
wherein:
the trusted intermediary server is a non-fungible token management portal server configured to implement a non-fungible token management portal;
the selected cloud services application is a software application that generates or stores non-fungible tokens associated cloud based services provided by the selected cloud services application; and
the retrieved data comprises a set of non-fungible tokens that are associated with both of the user and the selected cloud services application.

* * * * *

UNITED STATES PATENT AND TRADEMARK OFFICE
CERTIFICATE OF CORRECTION

| | | |
|---|---|---|
| PATENT NO. | : 12,432,214 B2 | Page 1 of 1 |
| APPLICATION NO. | : 18/082077 | |
| DATED | : September 30, 2025 | |
| INVENTOR(S) | : Sohil Arora | |

It is certified that error appears in the above-identified patent and that said Letters Patent is hereby corrected as shown below:

In the Claims

Column 14, Line 26, Claim 1, delete "of" and insert -- or --

Column 16, Line 44, Claim 9, after "associated" insert -- with --

Signed and Sealed this
Eighteenth Day of November, 2025

John A. Squires
*Director of the United States Patent and Trademark Office*